United States Patent [19]

LaMonica

[11] Patent Number: 5,545,329
[45] Date of Patent: *Aug. 13, 1996

[54] METHOD OF REFINING OIL

[75] Inventor: David A. LaMonica, Hermosa Beach, Calif.

[73] Assignee: Rochem Separation Systems, Torrance, Calif.

[*] Notice: The term of this patent shall not extend beyond the expiration date of Pat. No. 5,310,487.

[21] Appl. No.: 436,916

[22] Filed: May 8, 1995

[51] Int. Cl.$^6$ ................................................. B01D 69/02
[52] U.S. Cl. ...................................... 210/651; 210/321.84
[58] Field of Search ............................... 210/651, 321.84, 210/643, 639

[56] References Cited

U.S. PATENT DOCUMENTS

| | | |
|---|---|---|
| 2,930,754 | 3/1960 | Stuckey . |
| 2,958,656 | 11/1960 | Stuckey . |
| 3,370,102 | 2/1968 | Carpenter et al. . |
| 3,847,818 | 11/1974 | Madsen et al. . |
| 4,115,465 | 9/1978 | Elfert et al. . |
| 4,366,062 | 12/1982 | Kurihara et al. . |
| 4,460,292 | 7/1984 | Durham et al. . |
| 4,518,508 | 5/1985 | Conner . |
| 4,536,286 | 8/1985 | Nugent . |
| 4,557,949 | 12/1985 | Kurihara et al. . |
| 4,600,514 | 7/1986 | Conner . |
| 4,787,981 | 11/1988 | Tanahashi et al. . |
| 4,929,357 | 5/1990 | Schucker . |
| 4,929,358 | 5/1990 | Koenitzer . |
| 5,106,510 | 4/1992 | Rieber . |
| 5,178,772 | 1/1993 | Daley et al. . |
| 5,193,936 | 3/1993 | Pal et al. . |
| 5,207,791 | 5/1993 | Rieber . |
| 5,234,498 | 8/1993 | Graves, Jr. . |
| 5,310,487 | 5/1994 | Lamonica . |

FOREIGN PATENT DOCUMENTS

| | | |
|---|---|---|
| 0044872 | 2/1982 | European Pat. Off. . |
| 160960 | 12/1981 | Japan . |

*Primary Examiner*—Frank Spear
*Attorney, Agent, or Firm*—Weingram & Zall

[57] ABSTRACT

A method for refining oil, in particular domestic edible oils and petroleum crude oils, by membrane separation technology. The invention involves treating such oils in a membrane module system that provides optimal separation performance and service life. The described process simplifies oil processing and permits the attainment of the desired product in an essentially single step operation.

3 Claims, 3 Drawing Sheets

METHOD OF REFINING OIL

RELATED PATENT

This application is related to U.S. Pat. No. 5,310,487 to LaMonica, issued on May 10, 1994 from an application filed on Apr. 27, 1993.

BACKGROUND OF THE INVENTION

1. Field of the Invention

The present invention relates to a method for refining oils, particularly domestic edible oils and petroleum crude oils, using non-aqueous membrane separation. More particularly, the present invention relates to a method for refining oils by membrane separation technology using a polyetherimide membrane.

During the past decade, considerable interest has been focused upon the processing of oils, particularly edible oils such as soybean oil, cotton seed oil, corn oil and the like. In the processing of such oils, treating the oil with an organic solvent, such as hexane, has been common to obtain micella. Following such treatment, the organic solvent is removed to yield a crude oil composition. Unfortunately, the crude oil so obtained typically contain up to 10%, by weight, of impurities including phospholipids, organic sulfur compounds, waxes, dye compounds and the like. These impurities typically have adverse effects and removing them from the crude oil to enhance the usefulness and marketability of the product is necessary.

Workers in the art have discovered that these impurities could be effectively removed from crude oil by means of different types of industrial membranes, selection of a particular membrane being dependent upon the materials to be separated. Thus, for example, micro-filtration involves the membrane separation of macro molecules ranging from 500 to two million Angstrom units, ultrafiltration with molecules ranging in size from 40–2,000 Angstroms and reverse osmosis with ions and molecules ranging in size up to 20 Angstroms.

For example, in an ultrafiltration/reverse osmosis process, a crude glyceride oil composition is diluted with an organic solvent such as hexane and contacted with an ultrafiltration reverse osmosis membrane. Such membranes are typically polysulfones, polyacrylonitriles, or various polyamides. During the process the solvent is removed to yield a membrane permeable solution containing a degummed oil. Although, such techniques have met with a certain degree of success, inherent limitations have precluded the total exploitation thereof.

More specifically, the complete removal of phospholipids from the crude oil is impeded by the characteristics of the membrane employed. This has made it necessary to use many processing steps including, for example, degumming, refining, bleaching and deodorizing to remove free fatty acids, phosphatides, particulate, chlorine materials and the like. Considerable amounts of energy in the form of steam or electricity are required in affecting these processes, each of which is required to obtain properly processed crude oil. Accordingly, workers in the art have focused their interest upon the development of alternate methods for refining such oils.

2. Description of the Prior Art

Possibly relevant prior art references are:

U.S. Pat. No. 2,930,754 describes a method for separating hydrocarbons, e.g., aromatic and/or olefin from gasoline boiling range mixtures, by the selective permeation of the hydrocarbon through certain cellulose ester non-porous membranes. The permeated hydrocarbons are continuously removed from the permeate zone using a sweep gas or liquid.

U.S. Pat. No. 2,958,656 teaches the separation of hydrocarbons, i.e., aromatic, unsaturated, saturated, by passing some of a mixture thereof through a non-porous cellulose ether membrane and removing permeate from the permeate side of the membrane using a sweep gas or liquid. Feeds include hydrocarbon mixtures, naphtha (including virgin naphtha, naphtha from thermal or catalytic cracking, etc.)

U.S. Pat. No. 3,370,102 describes a process for separating a feed into a permeate stream and a retentate stream and uses a sweep liquid to remove the permeate from the face of the membrane to maintain the concentration gradient driving force. The process can be used to separate a variety of mixtures including various petroleum fractions, naphtha, oils and hydrocarbon mixtures.

U.S. Pat. No. 3,847,818 to Madsen et al describes devices that are generically suited for separating liquids into two fractions by means of a semipermeable membrane. The only description of the fluid passing through the device is it is a "liquid". The plurality of retentates of Madsen et al are removed at the top and at the bottom through passage 17. These retentate streams are not processed again.

U.S. Pat. No. 4,115,465 teaches the use of polyurethane membranes to separate aromatics from saturates via pervaporation.

U.S. Pat. No. 4,366,062 teaches reverse osmosis using a composite isocyanurate membrane. The method selectively separates at least one water soluble material from an aqueous solution. The membrane comprises a microporous substrate and a barrier layer about 0.01 to 0.1 micron thick. It is composed of a cross-linked polymeric material having an isocyanurate structure and substituents appended thereto selected from among hydrogen, glycidyl groups and alkyl radical groups having from two to five carbon atoms that may also contain functional hydroxyl groups or glycidyl groups. The crosslinked polymeric material has ester or ether linkages or combinations thereof connecting the isocyanurate structures to each other.

U.S. Pat. No. 4,557,949 teaches a method for making the reverse osmosis semipermeable membrane shown in U.S. Pat. No. 4,366,062.

U.S. Pat. No. 4,787,981 to Tanashi et al describes a process for the purification of crude glyceride oil compositions containing gums, waxes and organic solvents, by contacting the diluted crude oil composition with a semipermeable membrane comprising a polyimide. The resultant permeate is then bleached with clay and deodorized to obtain a purified glyceride oil.

U.S. Pat. No. 4,929,357 to Shucker describes the use of a non-porous isocyanurate crosslinked polyurethane membrane for separating aromatic-from non aromatic hydrocarbons.

U.S. Pat. No. 4,929,358 to Koenitzer describes the separation of aromatic hydrocarbons from non aromatics by permeation of the aromatic compound through a polyurethane-imide membrane under pervaporation or reverse osmosis conditions.

European Application 0044872 teaches selectively separating water soluble materials from a solution under reverse osmosis conditions using a membrane having a porous support layer carrying a barrier layer of cross-linked isocyanurate polymer.

Japanese Application 81/160960 teaches an isocyanurate network terpolymer useful for the production of a selective permeation membrane. A polymer having hydroxyl groups and tertiary amine groups in the side chain is reacted with cyanuric chloride and subjected to terpolymerization by reacting the tertiary amine groups with the resultant hydrochloride to give a polymerized polyisocyanurate. A polymer made using glycidyl methacrylate-styrene copolymer, diethyl amine in benzene and methanol was produced having a 2-hydroxy-3-diethylaminopropyl group. This (polytetra fluorethylene) polymer was crosslinked with cyanuric chloride and cast on a PTFE plate and kept for 24 hours at 40° to give a 44μ membrane. This membrane was used to separate a mixture of cyclohexane and benzene under pervaporation conditions. A permeate gas that was 100% benzene was recovered.

OBJECTS AND SUMMARY OF THE INVENTION

An object of the present invention is to refine oils, particularly domestic edible oils and petroleum crude oils, to remove undesirable compounds from it including free fatty acids, phosphatides, phosphoric lipids, sulfurous compounds, particulate and the like.

Another object of the present invention is to degum, refine, bleach and deodorize edible crude oils in a single step operation.

Still, another object of this invention is to provide a process for enhancing energy savings in conventional degumming, refining and bleaching of edible oils.

Another object of the invention is to provide a membrane process for refining oils, particularly edible oils and petroleum crude oils, using a semipermeable membrane comprising a polyimide.

Still another object of the present invention is to provide a process for refining oils, particularly edible oils and petroleum crude oils, in which waste waters and bleaching clays are eliminated.

Another object of the invention is to provide a process for the refining of edible oils in which essentially all of the hydrated and non hydrated phospholipids, most of the color compounds and some free fatty acids are held in the retentate while neutral oils and hexane permeate the membrane employed.

Yet another object of the invention is to provide a process for preparing soybean oil for direct physical refining.

Another object of the invention is to provide a process for refining edible oils in which the losses of neutral oil by entrapment with degumming residues and soaps found during alkali refining are substantially reduced.

A further object of the invention is to provide a process for the reduction of energy requirements for desolventizing soybean oil hexane micella.

Yet another object of the invention is to provide a process for refining oils in which the capital investment in the refining operation is reduced by combining purification steps into one process and the elimination of waste streams.

By the present invention, these objectives are attained in a novel processing sequence using an apparatus for filtering and separation with microfiltration, ultrafiltration, reverse osmosis membrane disposed between two essentially plate-like spacer elements.

More specifically, these objects are achieved by a method of refining an oil that comprises providing an oil composition containing impurities and an organic solvent. The oil composition is tangentially contacted, in parallel, with each of one side of a plurality of first semipermeable membrane filter elements to produce a plurality of first permeate streams on each of the other sides of the first filter elements and a plurality of first retentate streams on each of the one sides of the plurality of first filter elements.

The plurality of first retentate streams from the one sides of the first filter elements are removed and collected to form a first collected retentate. The plurality of first permeate streams are removed from the other sides of the first filter elements to form a first collected permeate.

The first collected retentate is contacted tangentially, in parallel, with each of one side of a plurality of second semipermeable membrane filter elements to produce a plurality of second permeate streams on each of the other sides of the second filter elements and a plurality of second retentate streams on each of the one sides of the plurality of second filter elements.

The plurality of second retentate streams are removed and collected from the one sides of the second filter elements to form a second collected retentate. The plurality of second permeate streams are removed from the other sides of the first filter elements to form a second collected permeate.

The collected permeates contain the refined oil substantially free of impurities and organic solvent.

The semipermeable membrane used comprises:

a polyimide consisting of a repeating unit of the general formula

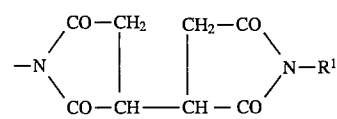

wherein $R^1$ represents a divalent organic group of the general formula

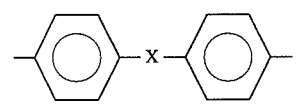

wherein x represents a divalent leeching group selected from the group consisting of —$CH_2$—, —$CH(CH_3)_2$—, —O—, and —$SO_2$.

More specifically, the present invention comprises purifying a crude edible oil composition containing gum material and wax impurities with an organic solvent using a semipermeable membrane comprising a polyimide consisting essentially of a repeating unit having the general formula:

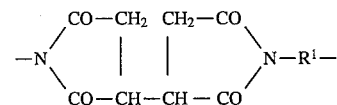

wherein $R^1$ represents a divalent organic group.

The apparatus in which the semipemeable membrane is used contains a membrane spacer filter element between two essentially plate-like spacer elements about which the liquid to be purified flows.

BRIEF DESCRIPTION OF THE DRAWINGS

These objects and other objects and advantages of the present invention will be more readily understood by reference to the following detailed description taken in conjunction with the accompanying drawings in which.

DETAILED DESCRIPTION OF THE INVENTION

Before discussing the merits of the present invention, examining the conventional technique employed by workers in the art for refining for example, edible crude oils will be useful. For this purpose, reference is made to FIG. 1 that depicts a flow diagram of a typical prior art process for affecting this end.

Figure 1:
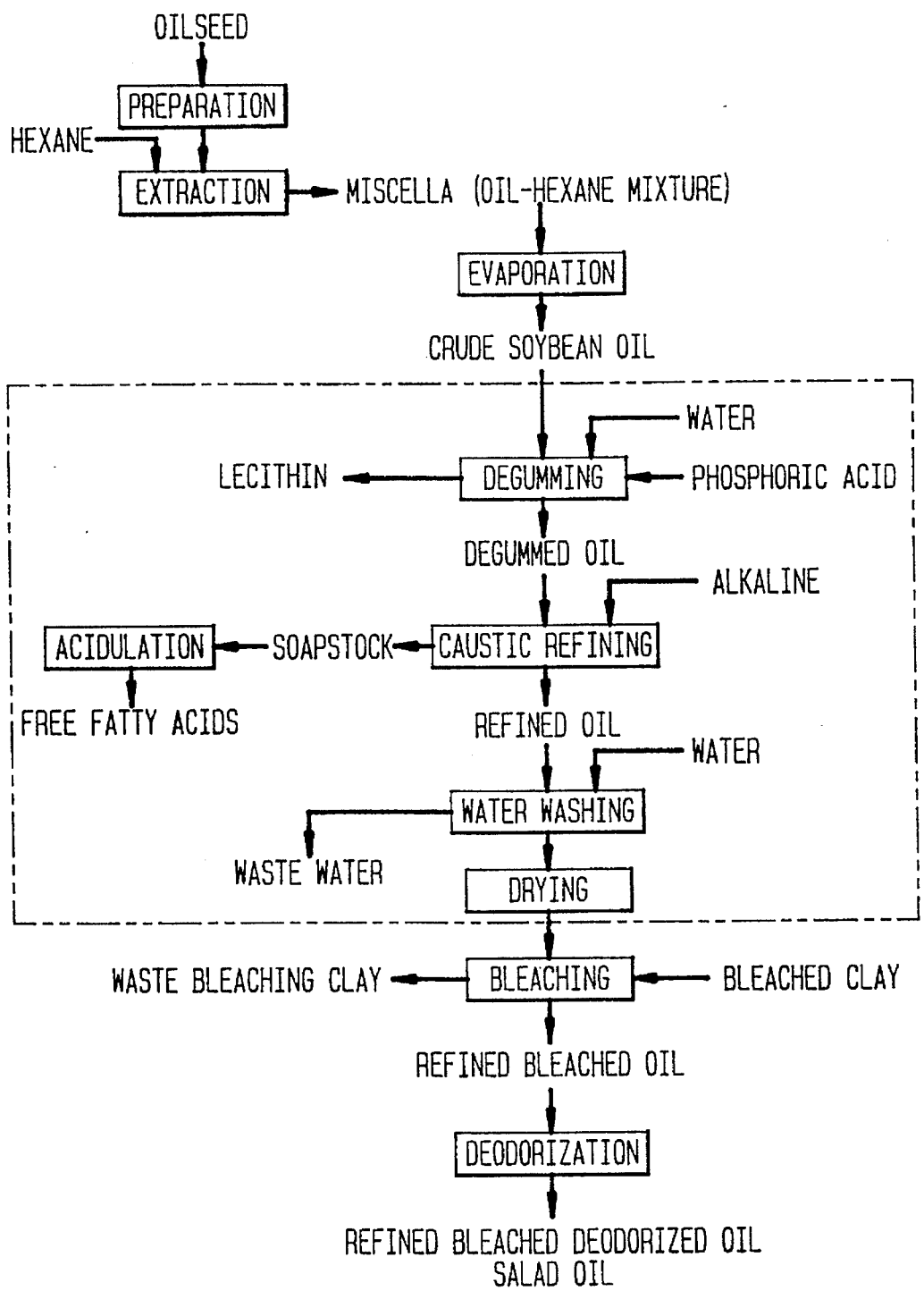
FIG. 1 is a flow diagram of a typical prior art process for refining edible oils.

In FIG. 1, a typical vegetable oil such as soybean oil, rapeseed oil, cottonseed oil, safflower oil, corn oil, sunflower oil and the like is extracted with an organic solvent such as hexane to obtain micella comprising the solvent and dissolved impurities. The solvent is then evaporated to obtain a crude glyceride oil composition, as for example, soybean oil. This crude glyceride oil usually comprises from 0.5–10% by weight of impurities including phospholipids, such as lecithin, as its primary ingredient, waxes, such as higher alcohols, organic sulfur compounds, peptides, free fatty acids, hydrocarbons, carbohydrates, dye compounds, metals and the like. These impurities cause polymerization or decomposition during the processing sequence, in use or upon heating. This results in oil coloration or unpleasant odors with the concomitant acceleration of oxidation or deterioration. Accordingly, the next step in the prior art process involves degumming to remove these impurities.

Referring to FIG. 1, the first step in the process for heating the crude oil following extraction involves degumming. This is effected by adding water to the oil to hydrate the gum material. The gum material is primarily composed of phospholipids that may be further purified to yield lecithin. Phosphoric acid may also be used to enhance the degumming operation.

The degummed oil is then subjected to chemical (caustic) refining, typically with sodium hydroxide, which reacts with free fatty acids to produce soaps. These soaps are then acidified to remove residual phospholipids.

Subsequently, pigments and destabilizing peroxide-like compounds are absorbed by acid activated bleaching clays. The oil is then finally heated under vacuum with steam sparging to strip trace amounts of free fatty acids, aldehydes and ketones and other volatile compounds.

In this processing sequence, large amounts of energy in the form of steam or electricity are required. Further, each step in this edible oil processing removes only one or two of the undesirable components. Besides the energy costs, caustic refining, water washing and bleaching produce waste streams, such as high BOD acidic waste water and used bleaching clay. These waste streams either require treatment and/or recovery due to economic or environmental concerns.

Figure 2:
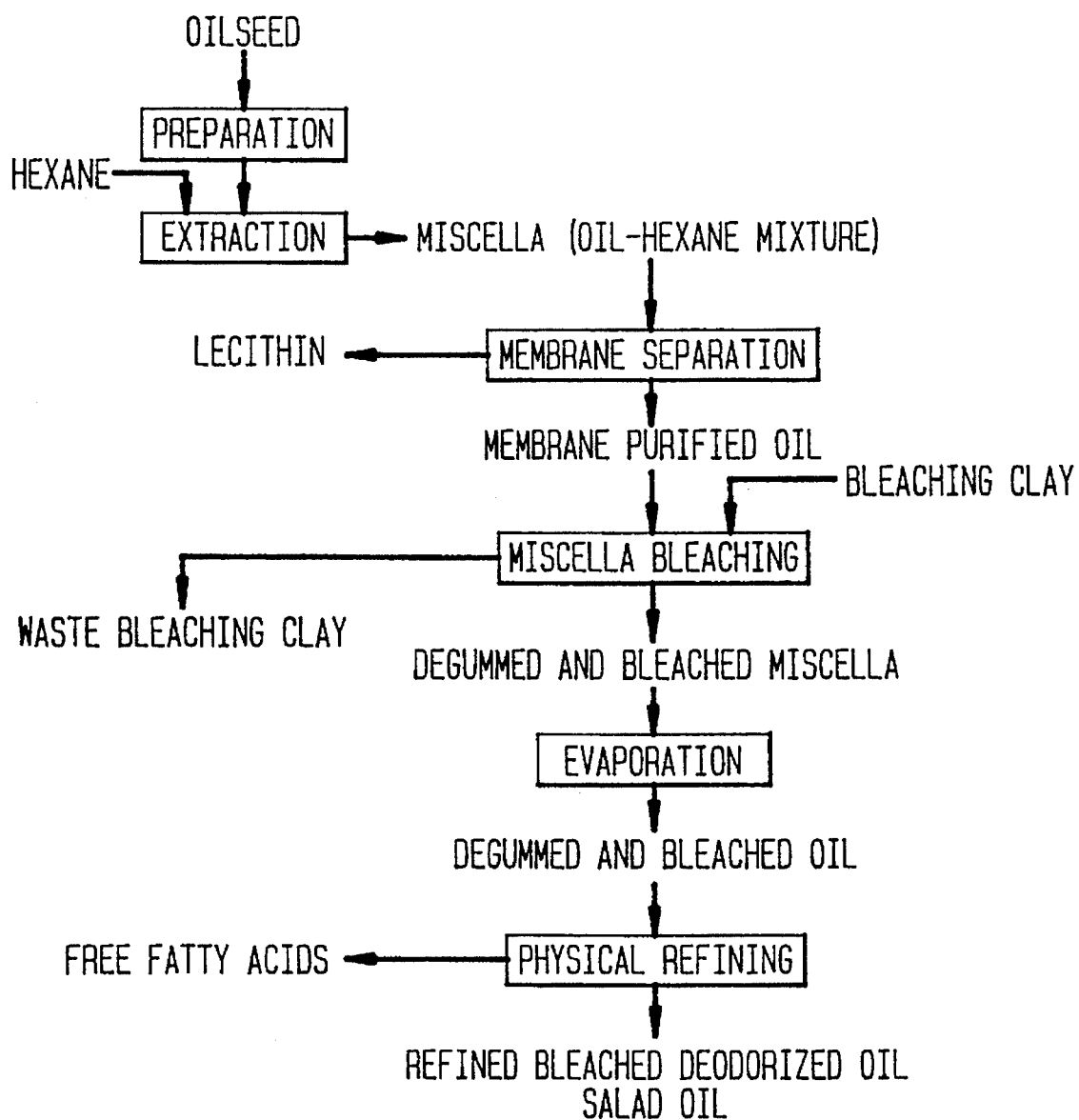
FIG. 2 is a flow diagram of an embodiment of a refining process of the invention.

An embodiment of the process of this invention is shown in the flow diagram of FIG. 2. Following the conventional preparation and extraction steps, the micella comprising a mixture of organic solvent and crude oil, is subjected to membrane separation to yield a purified oil in a single stage operation. In the membrane separation process, phospholipids are removed as well as most colored pigments and some free fatty acids. Accordingly, all steps in FIG. 1 shown in the dotted area are eliminated. There is no need for degumming, refining, water washing and drying. The only steps remaining in the process are the physical refining steps. An added benefit is that the bleaching requirements are reduced due to entrapment of some coloring pigments during the membrane separation process.

Another benefit of this invention is the elimination of the degumming process. This results in a reduction of neutral oil loss by 80%. This invention additionally eliminates the need for phosphoric acid and the production of non hydratable phosphatide while producing lecithin, a value added product.

Still further, the elimination of the alkaline refining step avoids the need to acidulate, along with eliminating waste waters from the degumming, acidulation and water washing steps. It also avoids the need for an oil drying process.

An added benefit to the novel processing sequence arises from the fact that there is at least a 50% reduction in bleaching composition requirements during the bleaching process.

The resultant oils obtained from the described process, for example, soybean, cottonseed, peanut, canola oils and the like can be readily physically refined. This is a significant benefit when these processed oils are competing with imported palm oil. Palm oil, which is prepared by physical refining, is a major price competitor in world markets with domestic oils such as soybean, peanut and cottonseed oil. Due to the process of this invention, the processed oil may be heated at high temperatures under a vacuum during which free fatty acids and undesirable odor and flavor compounds are removed. Previously, physical refining has not been applicable to domestic oils because of their high phospholipid content, namely, gums and lecithins. These compounds hydrate and become mucilaginous during degumming and/or caustic refining and carry off occluded neutral oil during their removal by centrifugation.

Figure 3:
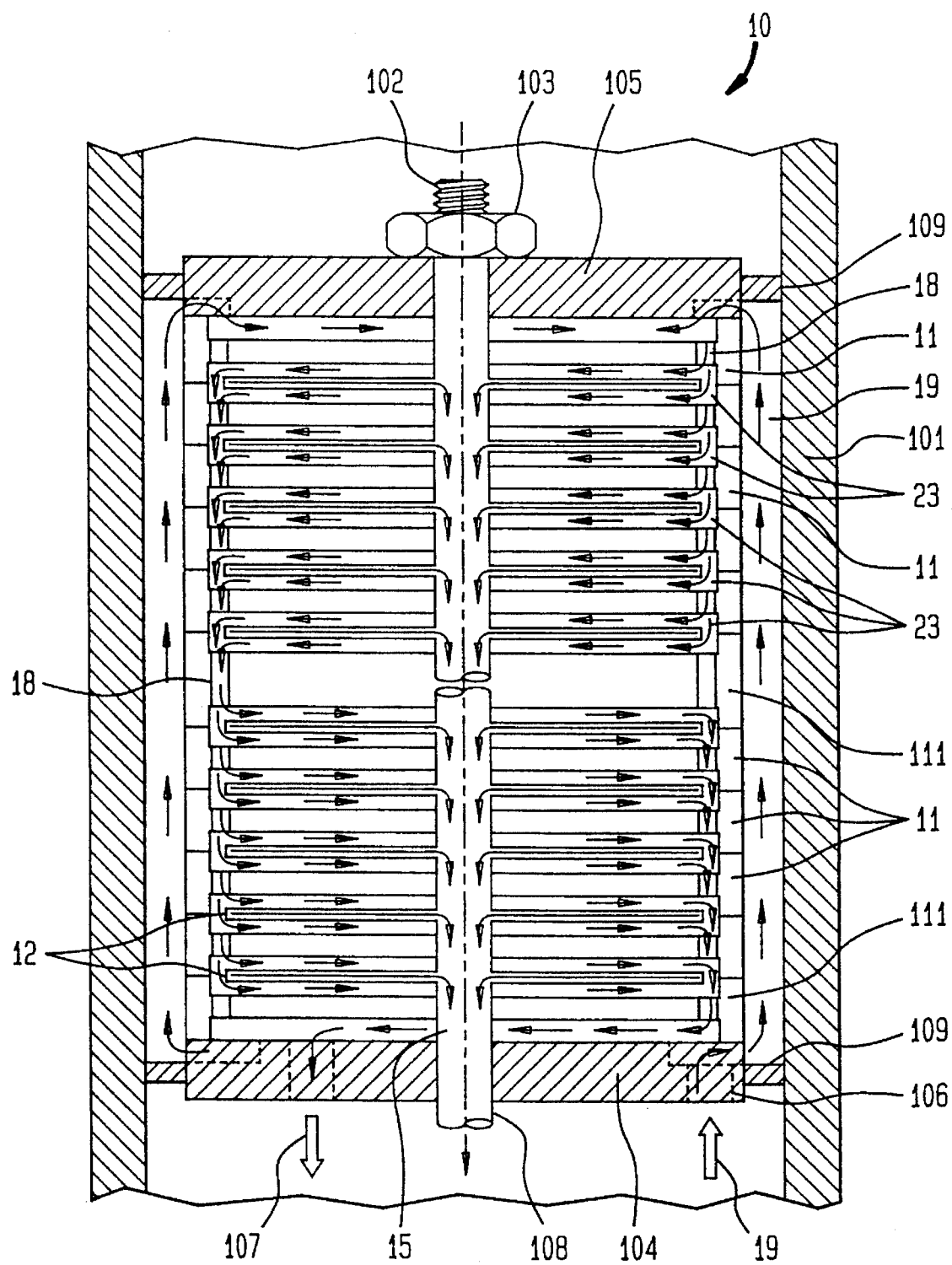
FIG. 3 is a cross-sectional view of an embodiment of an apparatus suitable for use in the practice of the present invention.

Referring to FIG. 3, there is shown a cross-sectional view of a typical filtering apparatus 10 suitable for use in the practice of the present invention. The apparatus 10 is used for filtering and separating a flowing medium by reverse osmosis. The apparatus 10 comprises a plurality of spacer elements 11 having filter elements 12 therein. These elements are stacked in the apparatus to form a filter element stack of predetermined length.

In a preferred embodiment, the apparatus 10 has filter elements 12 in the form of diaphragm cushions or pads. The apparatus 10 essentially comprises a tubular casing 101, spacer elements 11 and filter elements 12 that are alternately disposed in the casing 101, i.e., a filter element 12 is disposed between two spacer elements 11. At the two ends of the filter element stack there is no filter element 12. At the connection end of the filter element stack a connection flange 104 is provided; at the opposite end of the filter element stack, a terminal flange 105 is provided. The filter element stack and the two flanges 104, 105 are held together by a central clamping bolt 102 that extends through appropriate central holes of all these elements. At both ends of the filter element stack the clamping bolt 102 is provided with nuts 103 that hold the filter element stack together. Only one of the nuts 103 is shown in FIG. 3. The filter element stack is sealed in a known manner via gaskets or other seals 109 relative to the tubular casing 101 into which the filter element stack is placed.

In connection flange 104 is an opening or inlet 106 for the introduction of the flowing medium 19, i.e., an unfinished solution that is to be separated (i.e., a solution that has not been treated at all or has not been completely treated). An outlet 108 is also provided for the filtrate and an outlet 107 for the retentate.

The flowing medium 19, i.e., oil enters the interior of the casing 101 through the inlet opening 106 provided in the connection flange 104, and in particular into the gap between the filter element stack and the inner wall of the casing 101. In this gap, the flowing medium 19 passes into the space formed between the terminal flange 105 and the adjacent spacer element 11. The flowing medium 19 is shown in the apparatus 10 by arrows.

In the apparatus 10 shown in FIG. 3, the upper most spacer element 11 has only a single passage 18 for the flowing medium, with this passage being provided in the rim region 16 in the disk member. The flowing medium 19 passes through this passage 18 into a chamber 23 formed between two spacer elements 11. Since several spacer elements 11 are disposed so that the passages 18 are arranged one above the other, the flowing medium 19 passes into the chamber 23 of respectively adjacent spacer elements 11 disposed there below.

In the embodiment depicted in FIG. 3, a unit is formed of five spacer elements 11 connected with one another in this manner.

As noted, a filter element 12 is disposed in each chamber 23. The flowing medium 19 that is in the chambers 23 sweeps or passes over both sides of a respective filter element 12 disposed in the chamber 23. In FIG. 3, the flow is from right to left flowing toward the left side of the spacer element 11, whereby in the rim portion in the disk member there is similarly formed a passage 18 for the flowing medium 19.

The filter elements 12, which are disposed in the chambers 23, are in the form of diaphragm pads. The filtrate is conveyed to an opening provided in the filter element 12, i.e., in the diaphragm pad. In the embodiment depicted herein the opening is a central opening. The filter elements 12, i.e., diaphragm pads, accommodated in the chambers 23 are sealed relative to the spacer elements that confine them in a known manner in the region toward the filtrate outlet opening, which is symbolized by the central hole 15.

The spacer element 111 delimits the bottom of the unit formed of five spacer elements 11. This is provided, as with the uppermost spacer element 11, with a single passage 18 for the flowing medium 19, with this passage being provided in the rim region 16 in the disk member 17. As a result the flowing medium 19 can pass through this spacer element 11 through only the single passage 18. In the apparatus 10 the bottom of the unit is delimited by a spacer element 111 that again is provided with only a single passage 18 embodied in the rim region 16 in the disk member 17, so that through this passage 18, all of the concentrated flowing medium 19 (retentate) that leaves the apparatus 10 can leave the unit through the outlet 107 formed in the connection flange 104.

The filter element employed in the practice of the invention is a semipermeable membrane comprising a polyimide having repeating units of the general formula:

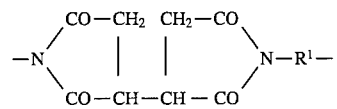

wherein $R^1$ represents a divalent organic group.

Typical of the membranes suitable for this purpose are those in which $R^1$ is represented by the general formula:

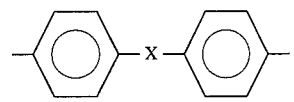

wherein x represents a divalent linking group such as: —CH—, —C(CH$_3$)$_2$—, —O—, —CO$_2$—, etc.

Prior Art Example 1

This Example relates to the prior art use of membranes of the type used in Applicant's invention. In particular, Prior Art Example 1 describes the method of processing by U.S. Pat. No. 4,787,981 Tanahashi et al.

Production of Polyimide Ultrafiltration Membrane

To a N-methyl-2-pyrrolidone solution containing 28% by weight of polyimide having an imidation rate of 99% or more and an inherent viscosity (n) of 0.73 that had the above-described general formula in which $R^1$ was

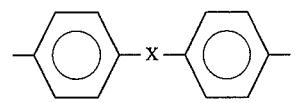

100 parts by weight of diethylene glycol based on 100 parts by weight of polyimide were added as a swelling agent to prepare a homogenous dope.

This dope was applied to the inside of a glass tube by cast coating, and the glass tube was immediately put into water of 5° C. and immersed for five hours. A tubular ultrafiltration membrane was obtained having an inner diameter of 12 mm, a thickness of 200 μm and a molecular weight cutoff of 20,000.

The module equipped with this membrane was attached to the livid passage line for the micella of crude soybean oil composition. A 27 wt. % hexane micella of crude soybean oil containing 2.18% by weight (based on the weight of the soybean oil) of phospholipid, as the crude glyceride oil composition, was subjected to ultrafiltration treatment by passing through the described membrane module in circulation under conditions of a pressure of 3 kg/cm$^2$, a temperature of 40° C. and a flow rate of 14/1 minute. From the resulting membrane permeable liquid, hexane was distilled away to obtain an ultrafiltration treated oil.

Twenty-five tons of this oil were heated to about 85° C. A 75% phosphoric acid solution was added to the ultrafiltration treated oil in an amount of 0.5% by weight based on the weight of the oil to carry out acid treatment by stirring. Then this ultrafiltration treated oil was additionally heated to 110° C., and activated clay was added in an amount of 0.8% by weight based on the weight of the treated oil. The composition was stirred for 30 minutes under 110 mm Hg and the activated clay was filtered off by a filter press to obtain a bleaching oil. This bleached oil was then heated to 260° C., and deodorizing was carried out by stripping with sparge steam in an amount of 4.5% by weight based on the bleached oil under 4 mm Hg abs. for 85 minutes to obtain 20 tons of a purified soybean oil. The resulting purified soybean oil was preserved for three months in an outdoor storage tank, and a preservation test was carried out.

What is claimed is:

1. A method of refining an oil comprising:

providing an oil composition containing impurities and an organic solvent;

tangentially contacting, in parallel, the oil composition with each of one side of a plurality of first semipermeable membrane filter elements to produce a plurality of first permeate streams on each of the other sides of the first filter elements and a plurality of first retentate streams on each of the one sides of the plurality of first filter elements, removing and collecting the plurality of first retentate streams from the one sides of the first filter elements to form a first collected retentate;

removing the plurality of first permeate streams from the other sides of the first filter elements to form a first collected permeate;

tangentially contacting, in parallel, the first collected retentate with each of one side of a plurality of second semipermeable membrane filter elements to produce a plurality of second permeate streams on each of the other sides of the second filter elements and a plurality of second retentate streams on each of the one sides of the plurality of second filter elements;

removing and collecting the plurality of second retentate streams from the one sides of the second filter elements to form a second collected retentate;

removing the plurality of second permeate streams from the other sides of the first filter elements to form a second collected permeate;

wherein the semipermeable membrane comprises:

a polyimide consisting of a repeating unit of the general formula

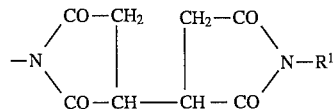

wherein $R^1$ represents a divalent organic group of the general formula

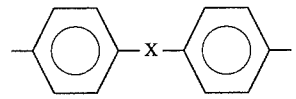

wherein x represents a divalent leeching group selected from the group consisting of —$CH_2$—, —$CH(CH_3)_2$—, —O—, and —$SO_2$.

whereby the collected permeates contain the refined oil substantially free of impurities and organic solvent.

2. The method of claim 1, wherein said organic solvent is hexane.

3. The method of claim 1, wherein the oil is contacted with the polyimide at a temperature ranging from 0°–15° C. at a pressure ranging from 0.1 to 50 mm/cm².

* * * * *